United States Patent [19]

Faunce et al.

[11] 4,217,918
[45] Aug. 19, 1980

[54] RATCHET CONVEYOR SYSTEM

[75] Inventors: Stuart F. Faunce, Fanwood, N.J.; Elbert R. Faust, Litchfield, Conn.

[73] Assignee: Faunce and Associates, Inc., Fanwood, N.J.

[21] Appl. No.: 67,031

[22] Filed: Aug. 16, 1979

[51] Int. Cl.³ ............................................. B08B 3/04
[52] U.S. Cl. .................................. 134/133; 134/141; 134/164
[58] Field of Search .............. 134/133, 134, 141, 160, 134/161, 164; 198/342, 752, 771; 204/198, 222

[56] References Cited

U.S. PATENT DOCUMENTS

| | | | |
|---|---|---|---|
| 1,907,013 | 5/1933 | Snow et al. | 134/161 |
| 3,099,275 | 7/1963 | Pianowski | 134/161 X |
| 3,604,435 | 9/1971 | Day, Jr. et al. | 134/134 X |
| 3,616,423 | 10/1971 | Faust | 134/160 X |
| 3,699,985 | 10/1972 | Faust | 134/141 |
| 3,815,617 | 6/1974 | Faust | 134/133 |
| 3,819,501 | 6/1974 | Faust | 204/198 |
| 3,871,394 | 3/1975 | Thegerstrom | 134/134 X |

Primary Examiner—Robert L. Bleutge
Attorney, Agent, or Firm—Kenneth P. Glynn

[57] ABSTRACT

The present invention is directed to an apparatus for moving articles in a continuous manner through a fluid bath. The apparatus comprises: a trough for holding said fluid bath, having an article feeding area and an article dispensing area; a ratchet conveyor having ratchet surfaces consisting of a plurality of ratchet floors and ratchet walls arranged in a stepwise fashion along a baseline, said ratchet conveyor being located at least partially within said trough such that the lower end of said ratchet conveyor is in said trough article feeding area and the higher end of said ratchet conveyor is in said trough article dispensing area; suspension structure connected to said ratchet conveyor so as to permit movement of said ratchet conveyor cyclically through an arc; and drive structure connected to said ratchet conveyor in a manner so as to cyclically traverse said ratchet conveyor from its initial position forwardly and upwardly through an arc, and so as to abruptly return said ratchet conveyor to its initial position to thereby cause articles on the ratchet conveyor to move successively forward thereon in a stepwise fashion, said initial position having an angle of no less than about 25° from the vertical, said arc which is traversed having an angle of no greater than about 35° and said arc which is traversed having a length adequate to move said ratchet conveyor a distance which is at least 1⅛ times the length of a ratchet floor.

10 Claims, 3 Drawing Figures

RATCHET CONVEYOR SYSTEM

BACKGROUND OF THE INVENTION

1. Field of the Invention

The present invention is directed to an apparatus for moving articles in a continuous manner through a fluid bath. More particularly, the present invention is directed to such an apparatus employing a ratchet conveyor system.

2. Prior Art

Frequently, articles of commerce are manufactured by techniques which involve application of undesirable foreign matter to their surfaces which must subsequently be removed. For example, metal and other types of articles are machined or cut with cutting oils which must then be removed from the articles. Likewise, molded articles sometimes contain release greases and oils which subsequently have to be removed from article surfaces.

At one time, cleaning of articles to remove surface oils, greases and other foreign substances was accomplished by batch operation. With the advent of the machine age, various devices were developed for the cleaning of articles on a continuous basis. Thus, for example, U.S. Pat. No. 3,099,275 describes a mechanism for conveying barrel-like containers with a plurality of workpieces therein through a series of liquid treating stations while enhancing tumbling of the workpieces to promote effective liquid contact. Also, U.S. Pat. No. 3,871,394 describes a device for treating articles arranged in containers with organic solvents to degrease the articles. The device includes a housing with openings which receive, immerse, rotate and dispense the containers moved through it.

U.S. Pat. Nos. 1,907,013 and 3,604,435 describe means for continuously moving articles through treating or cleaning fluids by stationary holders and "walking" holders which pick up the articles and move them from one stationary holder to an adjacent stationary holder. The "walking" holders may be toothed members or stands for the articles and are imparted a rotary motion so as to rise and fall while advancing.

U.S. Pat. No. 3,616,423 (Faust) describes a continuous system for plating, cleaning or rinsing articles which includes a trough suspended within a fluid bath so as to operate cyclically forward and upward and abruptly return to its initial position thereby to cause articles in the trough to inertially fall to positions successively forward of the trough and in new positions with respect to the trough and other articles. The articles are subsequently removed from the bath by a continuous conveyor belt on an incline, the belt having toothed surfaces for holding the articles as they are conveyed upwardly.

U.S. Pat. No. 3,699,985 (Faust) describes a continuous plating system which includes means for moving articles forwardly and downwardly through a bath and then upwardly. The upward movement is achieved with a cyclic ratchet conveyor which advances the articles in a stepwise fashion. While this reference describes a system having some elements in common with the system of the present invention, this prior art system differs in horizon angle, relationships of the ratchet floors and walls to one another as well as to the baseline, cycle arc angles and other aspects, e.g., eddy dampening means. In fact, this patent to Faust (an inventor of the present invention) leads one away from rather than toward the apparatus of the present invention in the specific teachings therein and is deficient in teachings which make the apparatus of the present invention so unique. It was discovered by inventor Faust that the system of his U.S. Pat. No. 3,699,985, which was built post-patenting, simply did not work with certain small articles. It was not until some five years later that inventors Faust and Faunce working together concluded that more than four parameters had to be radically changed to make the effective apparatus of the present invention.

Thus, notwithstanding the prior art, there has to date been no disclosure which teaches or renders the present invention obvious.

BRIEF DESCRIPTION OF THE PRESENT INVENTION

The present invention is directed to an apparatus for moving articles in a continuous manner through a fluid bath. The apparatus comprises:

(a) a trough for holding said fluid bath, having an article feeding area and an article dispensing area;

(b) a ratchet conveyor having ratchet surfaces consisting of a plurality of ratchet floors and ratchet walls arranged in a stepwise fashion along a baseline, the angle of said ratchet floors to said ratchet walls being within the range of about 85° to about 95°, the angle of said ratchet floors to said baseline being within the range of about 15° to about 25°, the ratio of the lengths of said ratchet walls to the length of said ratchet floors being within the range of about 0.25 to about 0.6, and the angle of said baseline to the horizon being within the range of about 5° to about 45°, said ratchet conveyor being located at least partially within said trough such that the lower end of said ratchet conveyor is in said trough article feeding area and the higher end of said ratchet conveyor is in said trough article dispensing area;

(c) suspension means connected to said ratchet conveyor so as to permit movement of said ratchet conveyor cyclically through an arc; and, (d) drive means connected to said ratchet conveyor in a manner so as to cyclically traverse said ratchet conveyor from its initial position forwardly and upwardly through an arc, and so as to abruptly return said ratchet conveyor to its initial position to thereby cause articles on the ratchet conveyor to move successively forward thereon in a stepwise fashion, said initial position having an angle of no less than about 25° from the vertical, said arc which is traversed having an angle of no greater than about 35° and said arc which is traversed having a length adequate to move said ratchet conveyor a distance which is at least 1$\frac{1}{8}$ times the length of a ratchet floor.

DETAILED DESCRIPTION OF THE PRESENT INVENTION AND THE DRAWINGS

The apparatus of the present invention may generally be used for moving articles through a fluid bath in a continuous manner. These articles need not be identical in shape or composition and may be any size from very small, e.g., soldered electronic parts, to relative large articles. Machined metals and plastics, as well as other materials, are included. The fluid bath through which the articles are moved may be virtually any fluid and is not limited to cleaning fluids but may include coatings, electroplating solutions and the like. The unusually broad scope of applicability of the apparatus of the present invention will become more apparent as the details are disclosed in conjunction with the drawings.

Figure 1:
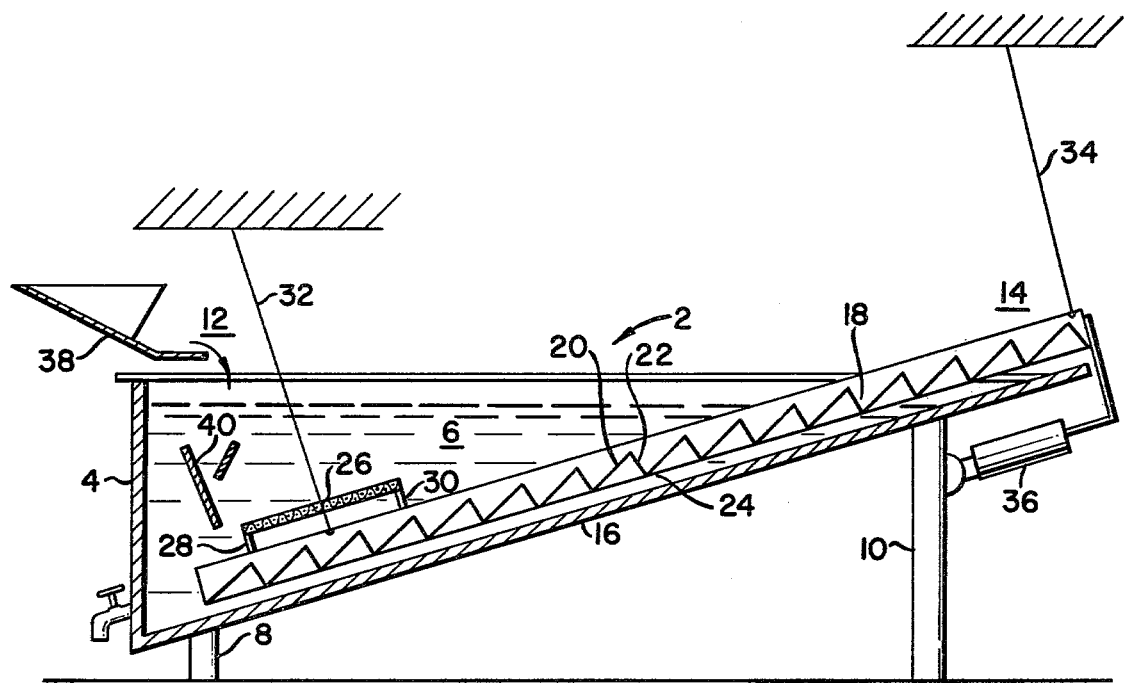
FIG. 1 is a cut side view of a preferred embodiment apparatus of the present invention.
Figure 2:
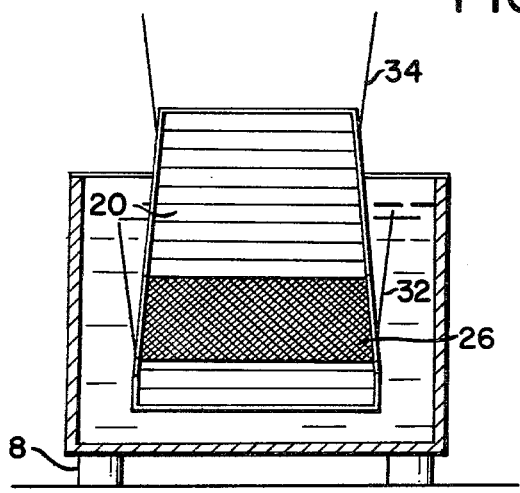
FIG. 2 is a cut frontal view of another preferred embodiment.

FIG. 1 illustrates a cut side view of a preferred embodiment of the apparatus of the present invention, and FIG. 2 illustrates a cut view of that apparatus, shown generally as 2. Trough 4 is supported by supports 8 and 10 and contains fluid bath through which articles (not shown) are moved. The trough 4 has an article feeding area shown generally as 12 and an article dispensing area shown generally as 14. Although trough 4 is shown to have an inclined bottom 16 to conform to the incline of ratchet conveyor 18, it should be noted that the incline is not essential to the present invention, and, in fact, the trough may be of any configuration which works.

Ratchet conveyor 18 has ratchet surfaces consisting of a plurality of ratchet floors and ratchet walls, as exemplified by 20 and 22, respectively.

Figure 3:
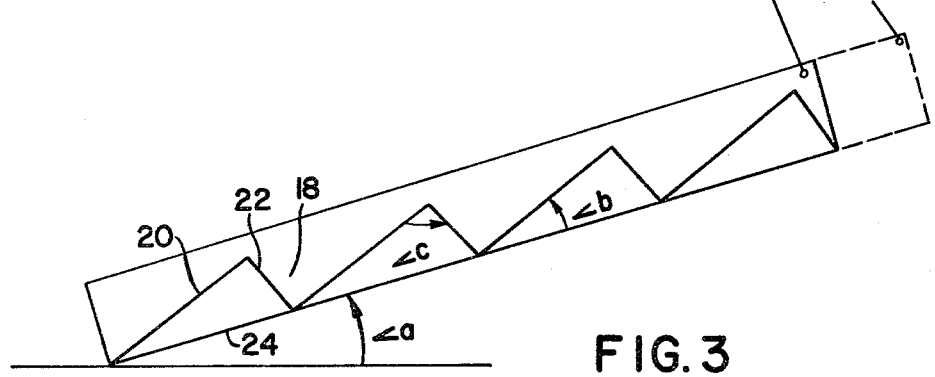
FIG. 3 is a schematic diagram illustrating initial parameters of certain aspects of motion of the apparatus of the present invention.

Referring now to FIGS. 1 and 3, it can be seen that the plurality of ratchet floors and ratchet walls are arranged in a stepwise fashion along baseline 24. The angle of the baseline 24 to the horizon is shown as angle "a" and is necessarily within the range of about 5° to about 45°, and is preferably within the range of about 10° to about 30°, e.g., 15°. The angle of the ratchet floors to the baseline is another critical angle and is shown in FIG. 3 as angle "b". This angle is generally within the range of about 15° to about 25° and is preferably about 18° to about 23°, e.g., 20°. Another critical angle is the angle between the ratchet floors and the ratchet walls, shown as angle "c" in FIG. 3. Angle "c" is necessarily within the range of about 85° to about 95°, and is preferably within the range of about 88° to about 92°.

Another critical aspect of the present invention is the ratio of the lengths of the ratchet walls to the length of the ratchet floors. In general, this ratio should be within the range of about 0.25 to about 0.6, and preferably about 0.35 to about 0.45.

As shown in FIG. 1, ratchet conveyor 18 is located at least partially in trough 4, such that the lower end of it is in trough 4 article feeding area 12 and the higher end is in trough 4 article dispensing area 14.

The ratchet conveyor 18 may have floors and walls constructed of any material and advantageously has sidewalls as shown. Thus the ratchet conveyor may be made of thermoplastic or thermoset material, fiberglass, metal or the like. Preferably, the plastic materials may be employed. Also, preferably, the ratchet floors and ratchet walls are perforated. For example, holes of about 1/16 inch to about ¼ inch diameter may be employed in an amount of about 25 percent to about 50 percent open area. Also, as should now be apparent to the artisan, the total number of ratchet steps is merely a function of design.

Although not essential to the present invention, optional eddy current dampening means may be employed to prevent eddy current effects which might otherwise hinder or reduce the effectiveness of the ratchet conveyor. In those embodiments wherein the articles to be moved are not slowed down or hindered by eddy currents which may develop, then eddy current dampening means need not be used. Also, even in embodiments wherein the articles to be moved are, in some manner, hindered by eddy currents, the effects of such eddy currents may be reduced or eliminated by use of opertures in the ratchet floors and ratchet walls as mentioned in the preceeding paragraph. Alternatively, the mentioned optional eddy current dampening means may be employed, as illustrated in FIG. 1. In that figure, apertured eddy current dampening means 26 is located above and connectively related via uprights 28 and 30 to ratchet conveyor 18. This dampening means 26 is advantageously employed near the lower end of ratchet conveyor 18 to minimize negative effects of eddy currents created by the cyclic motion of the ratchet conveyor 18. Also, dampening means 26 need not be connected directly to said ratchet conveyor 18 but may be connected to said apparatus by any known means provided it is located substantially above said ratchet conveyor 18. Additionally, dampening means 26 may be made of any apertured device that dampens eddies, such as racks, guide vanes, bars, screens and perforated metal plates and sheets, and advantageously is screen or perforated metal. Of these, screen having about 16 to about 4 mesh and perforated metal having holes of about 1/16 inch to about ⅜ inch diameter of about 25 percent to about 50 percent open area are preferred, and these need not be, but may conveniently be, evenly distributed.

Suspension means 32 and 34 are shown connected to and supporting ratchet conveyor 18 so as to permit movement of ratchet conveyor 18 cyclically through an arc. While cable suspension is illustrated, it should be noted that any equivalent means may be employed as are known in the art, without exceeding the scope of the present invention.

Drive means 36 is connected to ratchet conveyor 18 in a manner so as to cyclically traverse the ratchet conveyor 18 from its initial position forwardly and upwardly through an arc and so as to abruptly return ratchet conveyor 18 to its initial position thereby to cause articles on ratchet conveyor 18 to move successively forward thereon in a stepwise fashion. Drive means 36 comprises a piston and cylinder and appropriate controls as are well-known. Thus pressure fluid is first fed to one end and then the other end of the cylinder to cause a first forwardly and upwardly movement of ratchet conveyor 18 and then an abrupt reversal back to the initial position. The action of this reversible piston may be effected using pneumatic action or hydraulic action. Alternatively, functionally equivalent means to the piston and cylinder, e.g., electromagnetic or clutch and brake, may be employed and is well within the purview of the artisan. The controls included as part of the drive means may be any known system which will provide appropriate time intervals between forward and backward motion and/or between each cycle for some desired dwell or residence time.

In one preferred embodiment, a drive means is employed so as to achieve a maximum acceleration on forward motion of about one and one half to about two and one half "g" forces, and on backward motion of about two and one half to about three and one half "g" forces. Preferably, there is little or no dwell time between forward and backward motion. In one embodiment, this is employed in combination with a dwell time between cycles of about 2 to 10 seconds for moving machined metal parts, e.g., washers, through a cleaning bath. Other combinations are obviously viable for various articles and fluid baths.

Drive means 36 moves the ratchet conveyor 18 through an arc from an initial position to a full position and back to the initial position, as outlined above. The initial position is critical to the effectiveness of the present invention, and in general, the angle of the initial position from the vertical, shown in FIG. 3 as angle "d", is no less than about 25°, and is preferably no less than about 32°. The angle of the arc traversed is also critical to the invention. This angle, shown in FIG. 3 as angle "e", is generally no greater than about 35° and preferably it is no greater than about 22°. Lastly, this arc which is traversed, must be great enough in magnitude to move ratchet conveyor 18 a distance, shown as (1) in FIG. 2, which is at least one and one-eighth (1⅛) times the length of a ratchet floor. (If for some reason ratchet floors of varied lengths were employed, then it would be times the length of the longest ratchet floor.) Preferably, length 1 is at least one and one quarter (1¼) times the length of the ratchet floor and no more than one and one half (1½) times that length.

FIG. 2 illustrates another embodiment of the present invention in a frontal view. This apparatus is identical to that of FIG. 1 except that the eddy current dampening means 26 shown in FIG. 1 is not included. Like parts are identically numbered.

The apparatus shown in FIG. 1 and in FIG. 2 are operated as follows:

Optional article feeder 38 feeds articles into fluid bath 6 as shown by the arrow at the end of feeder 38. The articles are controllably (optional) dropped through chute 40 to the first ratchet of ratchet conveyor 18. Drive means 36 cycles the ratchet conveyor as described above with predetermined dwell times. Each time ratchet conveyor 18 is abruptly returned to its original position, the articles fall through the fluid into the subsequent ratchets and are advanced stepwise upwardly along ratchet conveyor 18 and ultimately off the top of ratchet conveyor 18 as the arrow shows, into collectors or subsequent operations (not shown). By this mechanism, articles are moved through the fluid bath in a controlled and continuous manner without the need for endless conveyor belts or article baskets.

What is claimed is:

1. An apparatus for moving articles in a continuous manner through a fluid bath, said apparatus comprising:
    (a) a trough for holding said fluid bath, having an article feeding area and an article dispensing area;
    (b) a ratchet conveyor having ratchet surfaces consisting of a plurality of ratchet floors and ratchet walls arranged in a stepwise fashion along a baseline, the angle of said ratchet floors to said ratchet walls being within the range of about 85° to about 95°, the angle of said ratchet floors to said baseline being within the range of about 15° to about 25°, the ratio of the length of said ratchet walls and the length of said ratchet floors being within the range of about 0.25 to about 0.6, and the angle of said baseline to the horizon being within the range of about 5° to about 45°, said ratchet conveyor being located at least partially within said trough such that the lower end of said ratchet conveyor is in said trough article feeding area and the higher end of said ratchet conveyor is in said trough article dispensing area;
    (c) suspension means connected to said ratchet conveyor so as to permit movement of said ratchet conveyor cyclically through an arc; and
    (d) drive means connected to said ratchet conveyor in a manner so as to cyclically traverse said ratchet conveyor from its initial position forwardly and upwardly through an arc, and so as to abruptly return said ratchet conveyor to its initial position to thereby cause articles on the ratchet conveyor to move successively forward thereon in a stepwise fashion, said initial position having an angle of no less than about 25° from the vertical, said arc which is traversed having an angle of no greater than about 35° and said arc which is traversed having a length adequate to move said ratchet conveyor a distance which is at least 1⅛ times the length of a ratchet floor.

2. The apparatus of claim 1 wherein ratchet floors and ratchet walls are perforated.

3. The apparatus of claim 1 further comprising:
    (e) apertured eddy current dampening means connected to said apparatus and located substantially above said ratchet conveyor.

4. The apparatus of claim 3 wherein said apertured eddy current dampening means comprises a screen or perforated plate.

5. The apparatus of claim 1 wherein the angle of said baseline to the horizon is within the range of about 10° to about 30°.

6. The apparatus of claim 1, 2, 3, 4 or 5 wherein the angle of said ratchet floors to said ratchet walls is within the range of about 88° to about 92° and wherein the angle of said ratchet floors to said baseline is within the range of about 18° to about 23°.

7. The apparatus of claim 1, 2, 3, 4, or 5 wherein said initial position has an angle of no less than 32° from the vertical and wherein said arc which is traversed has an angle of no greather than 22°.

8. The apparatus of claim 1, 2, 3, 4, or 5 wherein the ratio of the lengths of said ratchet walls to the length of said ratchet floor is within the range of about 0.35 to about 0.45.

9. The apparatus of claim 1, 2, 3, 4, or 5 wherein said arc which is traversed has a length adequate to move said ratchet conveyor at least 1¼ times the length of a ratchet floor and no more than 1½ times the length of a ratchet floor.

10. The apparatus of claim 1, 2, 3, 4, or 5 wherein the angle of said ratchet floors to said ratchet walls is within the range of about 88° to about 92° and wherein the angle of said ratchet floors to said baseline is within the range of about 18° to about 23°; wherein said initial position has an angle of no less than 32° from the vertical and wherein said arc which is traversed has an angle of no greather than 22°; wherein the ratio of the lengths of said ratchet walls to the length of said ratchet floors is within the range of about 0.35 to about 0.45; wherein said arc which is traversed has a length adequate to move said ratchet conveyor at least 1¼ times the length of a ratchet floor and no more than 1½ times the length of a ratchet floor.

* * * * *